United States Patent
Vessot et al.

(10) Patent No.: US 10,082,080 B2
(45) Date of Patent: Sep. 25, 2018

(54) FAN ROTOR FOR A TURBO MACHINE SUCH AS A MULTIPLE FLOW TURBOJET ENGINE DRIVEN BY A REDUCTION GEAR

(71) Applicant: SAFRAN AIRCRAFT ENGINES, Paris (FR)

(72) Inventors: Christian Vessot, Moissy-Cramayel (FR); Matthieu Leyko, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 219 days.

(21) Appl. No.: 15/120,679

(22) PCT Filed: Feb. 19, 2015

(86) PCT No.: PCT/FR2015/050407
§ 371 (c)(1),
(2) Date: Aug. 22, 2016

(87) PCT Pub. No.: WO2015/128563
PCT Pub. Date: Sep. 3, 2015

(65) Prior Publication Data
US 2017/0009656 A1    Jan. 12, 2017

(30) Foreign Application Priority Data

Feb. 28, 2014 (FR) .................................... 14 51626

(51) Int. Cl.
*B64C 11/14* (2006.01)
*F02C 7/14* (2006.01)
(Continued)

(52) U.S. Cl.
CPC .................. *F02C 7/14* (2013.01); *F02C 7/04* (2013.01); *F02K 3/06* (2013.01); *F04D 29/329* (2013.01);
(Continued)

(58) Field of Classification Search
CPC .. F04D 29/329; F02C 7/04; F02C 7/14; F02K 3/06; F05D 2220/36; F05D 2240/30;
(Continued)

(56) References Cited

U.S. PATENT DOCUMENTS 3,942,911 A   3/1976 Keenan et al.
4,722,666 A   2/1988 Dennison et al.
(Continued)

OTHER PUBLICATIONS

Written Opinion of the International Searching Authority dated May 15, 2015, issued in corresponding International Application No. PCT/FR2015/050407, filed Feb. 19, 2015, 5 pages.
(Continued)

*Primary Examiner* — Dwayne J White
*Assistant Examiner* — Jason Mikus
(74) *Attorney, Agent, or Firm* — Christensen O'Connor Johnson Kindness PLLC

(57) ABSTRACT

A forward fan rotor is disclosed with a hub of axis of rotation (X) and a cone mounted on the hub of the fan. The cone comprises an air bleed orifice which opens into an air duct of which a forward end portion passes through the fan rotor, said forward end portion comprising mechanical air entrainment means. The air bleed orifice has an annular shape and in that the cone is divided by said orifice into a front vertex portion and a rear frustoconical portion.

A turbomachine forward axial spool equipped with such a fan rotor is also disclosed.

8 Claims, 2 Drawing Sheets

(51) Int. Cl.
  *F02K 3/06* (2006.01)
  *F02C 7/04* (2006.01)
  *F04D 29/32* (2006.01)

(52) U.S. Cl.
  CPC ...... *F05D 2220/36* (2013.01); *F05D 2240/30* (2013.01); *F05D 2260/20* (2013.01); *F05D 2260/40311* (2013.01); *F05D 2260/98* (2013.01); *Y02T 50/675* (2013.01)

(58) Field of Classification Search
  CPC ............ F05D 2260/20; F05D 2260/98; F05D 2260/40311
  USPC .......................................................... 416/94
  See application file for complete search history.

(56) References Cited

U.S. PATENT DOCUMENTS

| | | | |
|---|---|---|---|
| 2006/0102780 A1 | 5/2006 | Parks | |
| 2011/0138765 A1* | 6/2011 | Lugg | F01D 15/10 |
| | | | 60/39.01 |
| 2013/0259687 A1 | 10/2013 | Suciu et al. | |
| 2014/0311580 A1* | 10/2014 | Howarth | F02C 7/057 |
| | | | 137/12 |

OTHER PUBLICATIONS

International Preliminary Report on Patentability dated Sep. 6, 2016, issued in corresponding International Application No. PCT/FR2015/050407, filed Feb. 19, 2015, 1 page.

International Search Report dated May 15, 2015, issued in corresponding International Application No. PCT/FR2015/050407, filed Feb. 19, 2015, 3 pages.

* cited by examiner

FAN ROTOR FOR A TURBO MACHINE SUCH AS A MULTIPLE FLOW TURBOJET ENGINE DRIVEN BY A REDUCTION GEAR

TECHNICAL FIELD OF THE INVENTION

The field of the present invention is that of aeronautical turbine engines and, more specifically, that of multi-flow turbojet engines or turboprop engines, comprising a reduction gear for driving the fan, or respectively the propeller.

BACKGROUND OF THE INVENTION

Conventionally, turbine engines firstly comprise, starting from upstream, one or more compressor modules which are arranged in series and compress the air sucked into an air inlet. The air is then introduced into a combustion chamber where it is mixed with a fuel and burned. The combustion gases pass through one or more turbine modules which drive the compressor(s). The gases are lastly ejected either into an exhaust nozzle to produce a propulsive force or onto a free turbine to produce the power which is recovered from a propeller shaft.

The current bypass turbojet engines having a high bypass ratio, or turbofans, comprise a fan rotor and a plurality of compressor stages, in particular a low-pressure (LP) compressor and a high-pressure (HP) compressor which belong to the primary body of the engine. Upstream of the low-pressure compressor, a large movable-blade wheel, or a fan, is arranged, which supplies both a primary duct with a primary flow passing through the LP and HP compressors and a secondary duct with a cold flow, or secondary flow, which is directed directly towards a cold-flow exhaust nozzle, referred to as the secondary exhaust nozzle. The fan is driven by the rotating shaft of the LP body and generally rotates at the same speed as said shaft. However, it may be advantageous to rotate the fan at a rotation speed which is lower than that of the LP shaft, in particular when said fan is very large, in order to better adapt it aerodynamically. For this purpose, a reduction gear is arranged between the LP shaft and a fan shaft which supports the fan. Such a design is described in particular in FR 20120051655 and FR 20120051656, which were filed on 23 Feb. 2012.

The turbojet engine having a speed reduction gear thus has clear advantages, but some difficulties must still be overcome.

In particular, said reduction gear must be lubricated and cooled in order to ensure the proper operation thereof without being damaged. Nowadays, it is estimated that the amount of oil required to ensure the operation of a turbojet engine equipped with a speed reduction gear is two times greater than in the case of a turbojet engine without a speed reduction gear. This oil makes it possible in particular to fulfil the functions of lubricating and cooling the movable components of the turbine engine.

It is known to cool said oil by means of an air/oil surface exchanger, which is also known by the name "SACOC", an abbreviation of the term "surface air cooled oil cooler". The exchange surface area is generally formed in a channel for circulating air of the turbojet engine. In said exchanger, a plurality of channels are provided in which the oil to be cooled circulates. The heat exchange is carried out by thermal conduction through the walls of the channels. Thus, the air and oil are not mixed.

In known heat exchangers, the heat exchanger is arranged in the secondary duct of the turbojet engine, downstream of the fan. In turbojet engines which are designed without a speed reduction gear, the rate of air flow which is required to cool the oil is low enough that it does not cause substantial pressure losses in the secondary duct.

However, turbojet engines equipped with a speed reduction gear require a much greater rate of air flow, for example two times greater than the rate of air flow of a turbojet engine without a speed reduction gear.

FR B1 2.965.299 is known, which relates to the lubrication of antifriction bearings, in which the oil is contained in lubrication chambers which are kept under excess pressure relative to the surrounding cavities in order to ensure that the oil is kept inside the lubrication chambers. Said excess pressure is achieved by injecting compressed air into the chamber. Said compressed air also makes it possible to produce a mist of oil, which allows a uniform distribution of the oil over the components of the turbine engine which is to be lubricated. In order to prevent the compressed air from having an overly high temperature in order to allow effective cooling of the components, this document proposes taking off the air upstream of the fan.

However, the air taken off is not cold enough to ensure, on its own, an effective cooling of the lubrication and cooling oil. Furthermore, the air is sucked into the oil chambers by means of a jet pump, which makes it necessary to take off air in the primary duct. The operation of such a device is thus liable to disrupt the flow of air in the primary duct, in particular when the amount of air to be taken off is significant.

U.S. Pat. No. 4,722,766 is also known, which describes and shows a device for cooling the lubrication oil of a reduction gear of a turbine engine. Said device comprises a fan rotor which is mounted so as to rotate about an axis of rotation which comprises a hub and a cone which is mounted upstream of the hub and in which is formed an air take-off opening which opens into an air channel which supplies a pump for driving the air, which is driven by the engine and is intended to power an exchanger in which the oil of the reduction gear circulates.

The air taken off at the surface of the cone by said opening and said channel is taken off having a rate of flow which is insufficient to ensure that the exchanger has a sufficient supply, to such an extent that it is necessary to pump said air by means of a mechanical pump, which thus takes off some of the power from the turbine engine.

The invention remedies this drawback by proposing a turbine engine fan rotor comprising improved means for taking off the air upstream of the fan.

SUMMARY OF THE INVENTION

Thus, to solve these problems, the invention proposes a turbine engine fan rotor which is intended to be mounted so as to rotate about an axis of rotation, the rotor comprising:
a hub, and
a cone which is mounted upstream of the hub;
the cone comprising an air take-off opening which opens into an air channel, an upstream end portion of which comprises mechanical means for driving the air, characterised in that the air take-off opening has an annular shape which is coaxial to the axis of rotation of the fan rotor, the cone being divided by the take-off opening into a front summit portion and a rear frustoconical portion.

According to the invention, the drive means make it possible to drive the air in the air channel, for example in the manner of a scoop. Said means can be configured to induce a gyration of the air flow entering the channel.

According to other features of the fan rotor:
the summit portion is attached to the frustoconical portion of the cone by the blades, said blades thus ensuring the connection between said portions of the cone, the blades thus having a structural role. The summit portion makes it possible to deflect foreign bodies which may hit said portion in flight;
the upstream end portion of the air channel has an annular cross section which is coaxial to the axis of rotation of the fan rotor, a ring of radial blades being interposed in the upstream end portion, the blades being connected to the hub for conjoint rotation;
the ring of blades is arranged in said cone;
the air channel is centred on the axis of rotation of the rotor.

The invention also relates to an upstream axial body of a turbine engine, in particular to a multi-flow turbojet engine, comprising a fan rotor of the type described previously, and at least one portion of a compressor shaft, in particular the low-pressure compressor shaft, characterised in that the air channel extends in the upstream axial body beyond the rotor, the air channel comprising at least one oil-cooling wall which is intended to cool oil by exchanging heat through said wall with the air flow circulating in the air channel.

According to other features of the upstream axial body:
the cooling wall is located downstream of the mechanical means for driving the air;
the rotational torque of the compressor shaft is transmitted to the rotor of the fan by means of a speed reduction gear, the speed reduction gear being lubricated by oil which is cooled through contact with said cooling wall.

The invention lastly relates to a turbine engine comprising an upstream axial body of the type described previously, and to at least one hollow central shaft, the air flow circulating in the air channel being discharged downstream in said hollow central shaft.

Thus, the air channel is centred on the axis of rotation of the body and has an axis which is rectilinear overall and is parallel to the axis of rotation of the body. The air channel is thus supplied with air exclusively by the annular take-off opening.

BRIEF DESCRIPTION OF THE DRAWINGS

Other features and advantages of the invention will become apparent upon reading the following detailed description, for the understanding of which reference will be made to the accompanying drawings, in which.

DETAILED DESCRIPTION OF THE DRAWINGS

In the rest of the description, an axial orientation "A" which is directed along the axis "X" of rotation of the turbine engine 10, and radial orientations which are directed from the axis "X" of rotation of the turbine engine 10 towards the outside will be adopted in a non-limiting manner. The axial orientation "A" is directed from the rear, which is on the right-hand side in FIG. 1, towards the front, which is on the left-hand side in FIG. 1, the air entering through the front of the turbine engine 10 and leaving it again through the rear.

The terms "upstream" and "downstream" are used with reference to the direction of flow of the air in the air channel 32 and in the ducts of the turbine engine.

Figure 1:
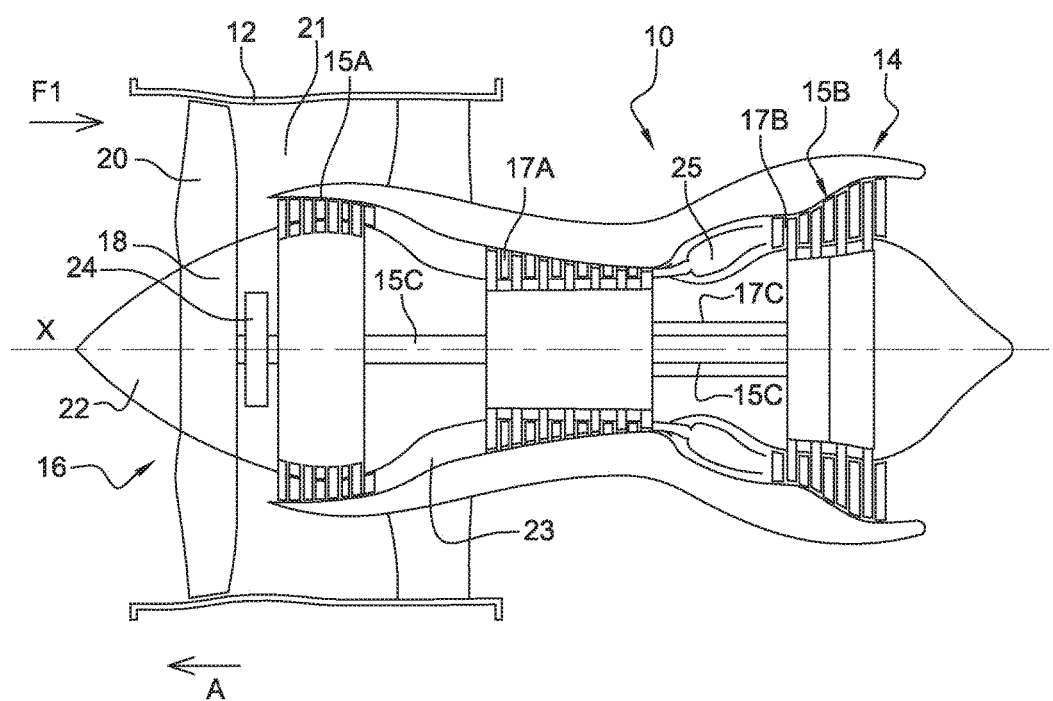
FIG. 1 is a schematic axial section through a turbine engine.

FIG. 1 shows a turbine engine 10. Said turbine engine is a bypass turbojet engine which is used for the propulsion of an aircraft.

The engine 14 is a twin-spool engine comprising a first, low-pressure body and a second, high-pressure body. The two bodies are mounted so as to rotate coaxially about the central axis "X". Such an architecture is well known from the prior art.

The low-pressure body comprises a front compressor 15A and a rear turbine 15B which are connected so as to rotate about the axis "X" by means of a first common central axial shaft 15C. Likewise, the high-pressure body comprises a front compressor 17A and a rear turbine 17B which are connected so as to rotate about the axis "X" by means of a second common central axial shaft 17C which is hollow. The shaft 15C of the low-pressure body is in this case arranged concentrically with the inside of the hollow shaft 17C of the high-pressure body.

A fan 16 is mounted so as to rotate about the central axis "X" on the engine 14, upstream of the low-pressure compressor 15A and in an annular casing. The fan 16 comprises a central hub 18 supporting a ring of blades 20 which extend radially towards the outside.

The fan 16 compresses the incident air F1 which is distributed downstream between a secondary duct 21 and a primary duct 23.

The air flow circulating axially in the primary duct 23 is compressed by the successive compressor stages 15A, 17A of the turbine engine 10 before entering a combustion chamber 25. The combustion energy is converted into mechanical energy through the turbines 17B, 15B which drive the compressors 15A, 17A and the fan 16. The air flow circulating in the secondary duct 21, for its part, is involved in providing the thrust of the turbine engine 10.

Figure 2:
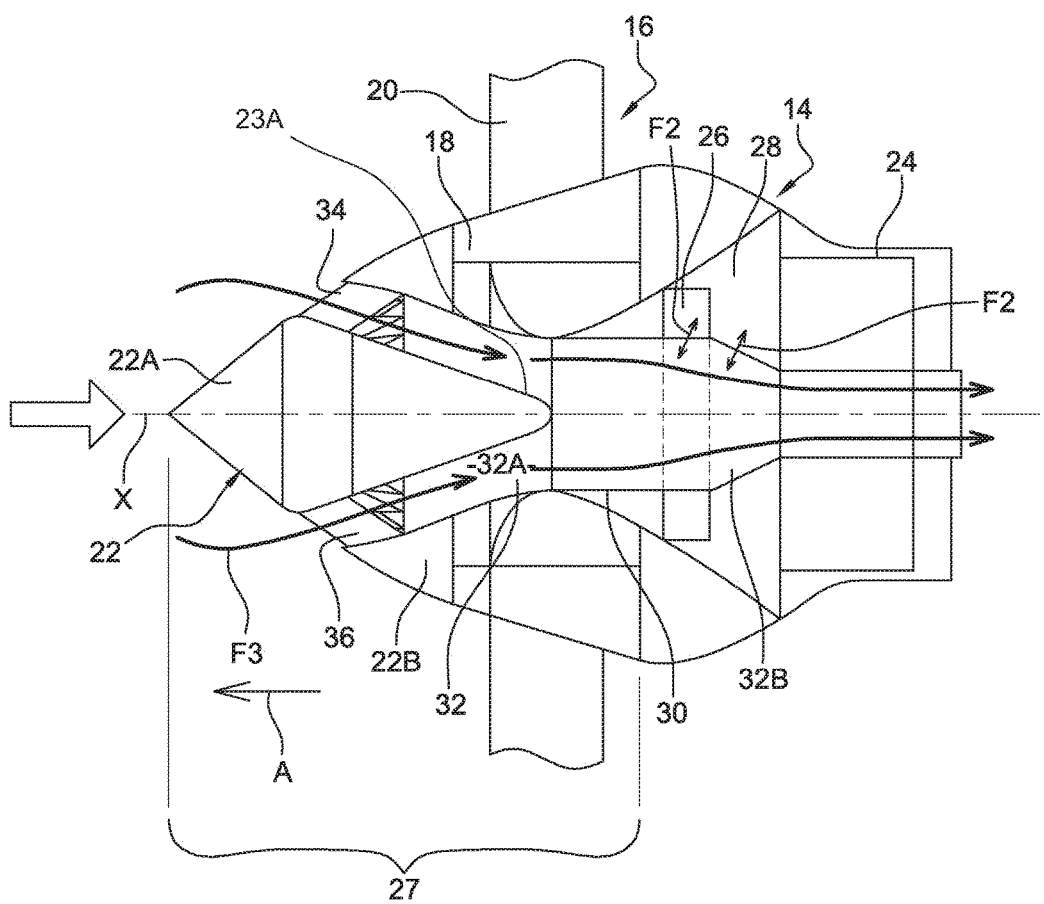
FIG. 2 is an axial half-sectional view showing a front end portion of a turbojet engine which is equipped with a speed reduction gear and which is equipped with a cooling wall which is arranged according to the teaching of the invention.

The front of the engine 14 has been shown in greater detail in FIG. 2. The front end of the engine 14 is equipped with a cone 22 or front end conical part which is mounted on the hub 18 of the fan 16 for conjoint rotation. The cone 22 has an asymmetrical shape having a central axis "X", the apex thereof being directed upstream.

The front end cone 22 and the hub 18 of the fan thus form a fan rotor 27 which rotates about the axis "X".

The fan 16 is set into rotation by the low-pressure turbine 15B.

In order to allow the fan 16 to rotate more slowly than the low-pressure body, the rotational torque of the low-pressure turbine 15B is transmitted to the fan 16, via the shaft 15C of the low-pressure compressor 15A, by means of a speed reduction gear 24, for example having an epicyclic gear train. The speed reduction gear 24 is arranged axially between the fan 16 and the low-pressure compressor 15A.

In the embodiment shown in FIGS. 2 and 3, an upstream end axial body 29 comprising the fan 16, the speed reduction gear 24 and at least one portion of the shaft 15C of the low-pressure compressor 15A forms a module which is pre-assembled independently of the rest of the engine 14 and which is intended to be assembled at a later stage with other modules of the engine 14 comprising in particular the low-pressure and high-pressure rotating assemblies and the combustion chamber 25.

The speed reduction gear 24 is placed under strain at very high speed. This causes very significant heating of the various components thereof. It is thus provided to cool said components by spraying oil which further makes it possible to lubricate the speed reduction gear 24.

In the example shown in the drawings, said oil is also used to lubricate and cool other elements of the turbine engine 10, in particular for bearings 26 supporting a front end portion of the drive shaft of the fan 16, as shown in FIG. 2.

The various components to be lubricated, in particular those of the speed reduction gear 24, are contained in a chamber 28 of the turbine engine 10. Said chamber 28 is designed to contain the oil in a water-tight manner, thus preventing oil from leaking into the rest of the turbine engine 10. The oil chamber 28 in this case is interposed axially between the hub 18 of the fan and the speed reduction gear 24.

Said chamber 28 is delimited in part by a wall 30, referred to as a cooling wall 30, which forms a separating partition between the inside of the chamber 28 and an air channel 32 which is referred to as a "cooling channel 32". The cooling channel 32 is arranged inside the gas turbine engine 14. The cooling channel 32 is for example formed inside the drive shaft of the rotor 27 and/or inside the shaft 15C of the low-pressure compressor 15A.

The cooling wall 30 is intended to cool the oil by thermal conduction between a cold air flow circulating in the cooling channel 32 through contact with a first face of said cooling wall 30, and the oil contained in the chamber 28 through contact with a second face which is opposite said cooling wall 30, as illustrated by the double arrows "F2" in FIG. 2.

In order to increase the surface area for heat exchange with the air, the face of the cooling wall 30 which forms the inside of the cooling channel 32 is dotted with fins (not shown).

The cooling wall 30 is arranged axially behind the cone 22.

The cooling of the oil requires an increased rate of air flow in the cooling channel 32. In order to prevent causing pressure losses in the primary duct 12, the invention proposes taking off the air upstream of the fan 16.

Thus, as shown in FIG. 2, the cooling duct 32 is supplied with air by at least one upstream air take-off opening 34 which is arranged in front of the hub of the fan 16.

An upstream end portion 32A of the cooling channel 32 passes through the fan rotor 27, thus passing through the end cone 22 then through the hub 18 of the fan 16 to guide the air flow as far as the cooling wall 30. The upstream end portion 32A thus extends axially in the upstream axial body 29 beyond the rotor 27. The upstream end portion 32A of the cooling channel 32 is thus radially delimited by a wall rotating about the axis "X" of the gas turbine engine 14.

The upstream end portion 32A of the channel is equipped with mechanical means for driving the air. The drive means are located upstream of the cooling wall 30 in order to accelerate the air flow before said flow comes into contact with the cooling wall 30.

In the example shown in the drawings, the cooling channel 32 is supplied with air exclusively by the air take-off opening 34.

In a variant of the invention which is not shown, the cooling channel is supplied firstly with air which is taken off in front of the hub of the fan, and secondly with air which is taken off in the primary duct.

Figure 3:
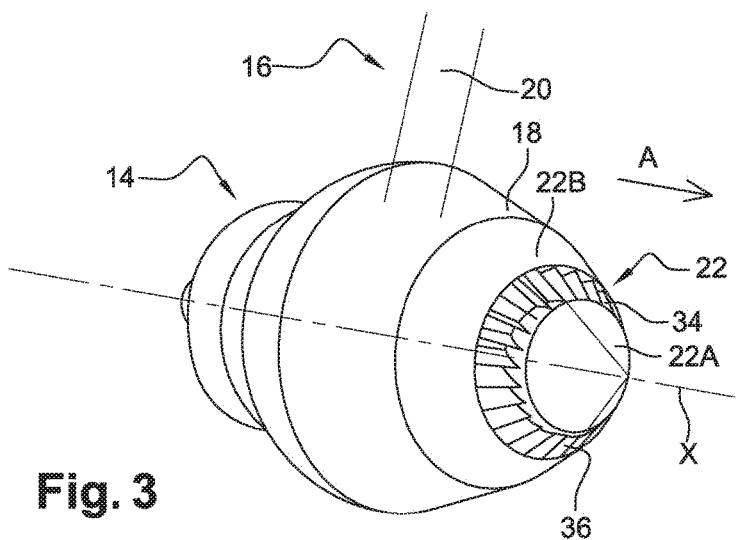
FIG. 3 is a perspective view showing the front end portion from FIG. 2 which is equipped with a rotating cone comprising air take-off openings for supplying the cooling wall.

In the example shown in FIGS. 2 and 3, the cooling channel 32 comprises more particularly a single air take-off opening 34 which opens axially toward the front into the end cone 22 of the gas turbine engine 14.

In this case, the air take-off opening 34 has an annular shape which is coaxial to the axis "X" of rotation of the fan 16. Thus, the cone 22 is divided by the take-off opening 34 into a front summit portion 22A and a rear frustoconical portion 22B.

In a non-limiting embodiment of the invention, it is estimated that, for a turbine engine 10 having a power of 10 MW which is equipped with a reduction gear for driving the fan, the rate of air flow required to effectively cool the oil is approximately 2 kg·s$^{-1}$. So that this rate of flow can be achieved while the aircraft is taking off, that is to say at a speed of air movement towards the rear which is relatively low with respect to the turbine engine 10, it has been calculated that the area of the air take-off opening 34 in cross section should be less than 10% of the surface area of the front end cone 22.

As illustrated in FIG. 3, the means for driving the air are formed in this case by a ring of radial driving blades 36 which are interposed in the upstream end portion 32A of the channel. The blades 36 are connected to the fan rotor 27 for conjoint rotation to make it possible to drive the air entering during the rotation of the fan 16.

The driving blades 36 are arranged in this case in the cone 22, directly in front of the annular take-off opening 34, to drive the air in the cooling channel 32 during the rotation of the fan 16. The inclination of the blades 36 is determined according to the minimum rate of air flow required for satisfactory cooling of the oil by exchanging heat through the cooling wall 30.

By way of example, the blades 36 are dimensioned so as to have as neutral an effect as possible with respect to the flow of the air flow at a cruising speed of the aircraft, imparting at most a gyration of the air.

For lower movement speeds of the aircraft, the blades 36 make it possible to drive the air flow inside the cooling channel 32, whilst imparting a greater gyration thereon, however.

This gyration of the air in the cooling channel 32 advantageously makes it possible to produce a greater convection which improves the cooling of the oil through the cooling wall 30. However, this gyration must be controlled in order to limit the pressure losses in the cooling channel 32.

This arrangement of the blades 36 makes it possible to attach the summit portion 22A to the frustoconical portion 22B of the cone 22.

This configuration is advantageous because the summit portion 22A of the cone 22 makes it possible to prevent foreign bodies from entering through the opening 34 by deflecting them.

The blades 36 of the ring do not necessarily all have the same structure. As has been seen previously, the arrangement of the blades 36 makes it possible to attach the summit portion 22A to the frustoconical portion 22B of the cone 22, and to do this it is sufficient for only some blades 36, that is to say at least three blades 36, to connect the front summit portion 22A to the frustoconical portion 22B, by being for example formed so as to be integral with the summit 22A and frustoconical 22B portions. The other blades 36 can for example have a thinner profile without necessarily being rigidly connected to the two summit 22A and frustoconical 22B portions at the same time. For example, such blades 36 can be detachably mounted in the opening 34, by being attached to the single summit portion 22A, in a detachable manner, in order to allow the potential replacement thereof.

In this configuration, the upstream end portion 32A of the cooling channel 32 thus has an upstream end portion having an annular cross section which is coaxial to the axis "X" of the turbine engine 10. The upstream end portion 32A axially converges downstream so as to open into a downstream end portion 32B having a circular cross section. In the example shown in FIG. 2, the cooling wall 30 is arranged in the downstream end portion 32B of the cooling channel 32.

The summit portion 22A has a portion 23A downstream which tapers off and which has for example a conical shape. This configuration makes it possible to radially move the air back towards the inside, that is to say towards the axis "X" of the turbine engine 10, close to the cooling wall 30.

The upstream end portion 32A of the cooling channel 32 contained between the take-off opening 34 and the cooling wall 30 is short and rectilinear overall. The air flow circulating in the cooling channel 32 thus suffers very few pressure losses between the entrance thereof into the cooling channel 32 and the passage thereof in the region of the cooling wall 30.

The downstream end portion 32B of the cooling channel 32 is rectilinear having a circular cross section which is centred on the axis "X". Thus, after the passage thereof in contact with the cooling wall 30, the cooling air is discharged axially towards the rear in a hollow central shaft of the turbine engine 10 as far as a downstream opening (not shown) for output to the open air. This makes it possible to maintain a high rate of flow for the passage of air in the region of the cooling wall 30.

The air flow circulating in the cooling channel 32 thus flows axially from upstream to downstream, as indicated by the arrows "F3" in FIG. 2.

During the operation of the turbine engine 10, the fan 16 is set into rotation. The cold air entering the cooling channel 32 is driven by the driving blades 36. The cold air flow thus driven by the driving blades 36 flows axially downstream in the cooling channel 32 as far as the cooling wall 30. The heat of the hot oil is transferred to the cold air flow through the cooling wall 30. Then, the air flow heated in this way continues to flow in the cooling channel 32 axially towards the rear until said flow is discharged into the open air.

The turbine engine 10 which is produced according the teaching of the invention makes it possible to circulate a high rate of air flow in the cooling channel 32 without disrupting the air flow in the secondary duct 21. This thus makes it possible to cool the oil very effectively.

The arrangement of the air take-off opening 34 on the front end cone 22 makes it possible in particular to benefit from air flowing at a high axial speed, for example of between 0.5 and 0.6 Mach, upon the entrance thereof into the air take-off opening 34.

Furthermore, the cone 22 sets the blades 36 into rotation to suck in the air entering the cooling channel 32. The high air intake speed makes it possible to achieve a high rate of air flow in the cooling channel 32.

Furthermore, the upstream portion of the cooling channel 32 is short and practically straight, and this makes it possible to prevent pressure losses from the air flow between the inlet opening 34 and the cooling wall 30.

The invention claimed is:

1. A turbine engine fan rotor which is intended to be mounted so as to rotate about an axis of rotation (X), the rotor comprising:
   a hub, and
   a cone which is mounted upstream of the hub;
   the cone comprising an air take-off opening which opens into an air channel, an upstream end portion of which comprises a ring of radial blades, wherein the air take-off opening has an annular shape which is coaxial to the axis of rotation (X) of the fan rotor, the cone being divided by the take-off opening into a front summit portion and a rear frustoconical portion.

2. The fan rotor according to claim 1, wherein the summit portion is attached to the frustoconical portion of the cone by the ring of radial blades.

3. The fan rotor according to claim 1, wherein the ring of blades is arranged in said cone.

4. The fan rotor according to claim 1, wherein the air channel is centred on the axis of rotation (X) of the rotor.

5. An upstream axial body of the turbine engine comprising a turbine engine fan rotor which is produced according to claim 1, and at least one portion of a compressor shaft, wherein the air channel extends in the upstream axial body beyond the fan rotor, the air channel comprising at least one oil-cooling wall which is intended to cool oil by exchanging heat through said wall with the air flow circulating in the air channel.

6. The upstream axial body according to claim 5, wherein the cooling wall is located downstream of the ring of radial blades.

7. The upstream axial body according to claim 6, wherein the rotational torque of the compressor shaft is transmitted to the rotor of the fan by a speed reduction gear which is placed in the upstream axial body, the speed reduction gear being lubricated by oil which is cooled through contact with said cooling wall.

8. A turbine engine comprising the upstream axial body according to claim 5, and at least one hollow central shaft, wherein the air channel opens downstream into the hollow central shaft, the air flow circulating in the air channel being discharged downstream into said hollow central shaft.

* * * * *